United States Patent
Gazit et al.

(10) Patent No.: US 11,921,753 B2
(45) Date of Patent: Mar. 5, 2024

(54) SYSTEM AND METHOD FOR PREAUTHORIZING DATABASE TRANSACTION COMMITS

(71) Applicant: Karma Shopping Ltd., Tel Aviv (IL)

(72) Inventors: Omer Gazit, Hod HaSharon (IL); Yuval Hoch Ronen, Tel Aviv (IL)

(73) Assignee: KARMA SHOPPING LTD., Tel Aviv (IL)

( * ) Notice: Subject to any disclaimer, the term of this patent is extended or adjusted under 35 U.S.C. 154(b) by 53 days.

(21) Appl. No.: 17/664,512

(22) Filed: May 23, 2022

(65) Prior Publication Data
US 2023/0376507 A1 Nov. 23, 2023

(51) Int. Cl.
G06F 16/28 (2019.01)
G06F 16/22 (2019.01)
G06F 21/62 (2013.01)
G06Q 30/0601 (2023.01)

(52) U.S. Cl.
CPC ........ *G06F 16/283* (2019.01); *G06F 16/2282* (2019.01); *G06F 21/6254* (2013.01); *G06Q 30/0633* (2013.01)

(58) Field of Classification Search
CPC ....... G06F 12/1408; G06F 21/00; G06F 21/10
USPC ........................................................ 707/600
See application file for complete search history.

(56) References Cited

U.S. PATENT DOCUMENTS

| | | | |
|---|---|---|---|
| 7,490,758 B2* | 2/2009 | Drummond | G06Q 20/327 |
| | | | 235/379 |
| 8,473,953 B2 | 6/2013 | Bourbonnais et al. | |
| 10,191,932 B2 | 1/2019 | Lehouillier et al. | |
| 10,915,907 B2 | 2/2021 | Arko et al. | |
| 2011/0000962 A1* | 1/2011 | Chan | G06Q 50/30 |
| | | | 235/382 |
| 2014/0162598 A1* | 6/2014 | Villa-Real | G07F 7/0886 |
| | | | 455/411 |
| 2020/0272619 A1 | 8/2020 | Alferov | |

* cited by examiner

*Primary Examiner* — Hung T Vy
(74) *Attorney, Agent, or Firm* — M&B IP Analysts, LLC (57) ABSTRACT

A system and method for committing preauthorized database transactions generates a preauthorized database transactions based on a received parameter and a parameter value. The method further includes storing the generated preauthorized database transaction in a temporary storage; accessing a reference database to determine a current value of the received parameter; determining that a current value of the received parameter matches the received parameter value; and committing the preauthorized database transaction to a database.

19 Claims, 7 Drawing Sheets

SYSTEM AND METHOD FOR PREAUTHORIZING DATABASE TRANSACTION COMMITS

TECHNICAL FIELD

The present disclosure relates generally to database transactions, and specifically to preauthorizing database transaction commits to decrease network bandwidth utilization and increase security.

BACKGROUND

Enterprise resource planning (ERP) software refers to systems which are used for business management. One common use for ERP systems is for warehouse management systems (WMS). Such systems are used to manage inventory, receive shipping orders, receive purchase orders, and the like. The WMS is required to service a large number of users, often simultaneously. Users of the WMS may be, for example, warehouse workers, suppliers, buyers, and the like.

The WMS includes a database for managing inventory. WMS databases are required to be transactional, meaning that they support ACID properties. ACID is an industry acronym standing for atomicity, consistency, isolation, and durability. Atomicity is a property which means that all instructions which are part of a transaction (e.g., inserting or deleting a row in a table) are treated as a single unit which either all succeed, or all fail. Consistency is a property which guarantees that any operation performed on the database is consistent with given database constraints. Isolation is a property which ensures concurrent transactions do not affect each other, and durability means that once data was written or erased (i.e., changed), such a change is persistent, especially in the case of system failure.

For example, if two units of a stocked item are registered in the WMS database, and the WMS accepts three requests to update the item as sold, for example in response to receiving a request to purchase the stocked item, then the WMS database should only record two of the transactions.

ERP systems may also be used to record personal identifiable information (PII), payment card industry (PCI) information, and the like. ERP systems which are network accessible are also exposed to cybersecurity risk. For example, in December of 2013 Target Corporation suffered a data breach which resulted in a loss of millions of dollars for the company, and exposed data for hundreds of millions of users. Potentially sensitive data, such as credit card numbers used by users when performing transactions on their website, may have been exposed.

Furthermore, such systems, and web servers employing such systems, are affected by the seasonality of use of users. For example, during major holidays a large number of users may attempt to access limited web resources of a commerce web server in order to complete certain transactions. This often requires servicing more users than a web server is intended, and often this causes crashes, slows down network traffic, and provides for an overall unpleasant user experience, resulting in real damage to the company providing their services through the web server.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for committing preauthorized database transactions. The method comprises: generating a preauthorized database transaction based on a received parameter and a parameter value; storing the generated preauthorized database transaction in a temporary storage; accessing a reference database to determine a current value of the received parameter; determining that a current value of the received parameter matches the received parameter value; and committing the preauthorized database transaction to a database.

Certain embodiments disclosed herein also include a non-transitory computer readable medium having stored thereon causing a processing circuitry to execute a process, the process comprising: generating a preauthorized database transaction based on a received parameter and a parameter value; storing the generated preauthorized database transaction in a temporary storage; accessing a reference database to determine a current value of the received parameter; determining that a current value of the received parameter matches the received parameter value; and committing the preauthorized database transaction to a database.

Certain embodiments disclosed herein also include a system for committing preauthorized database transactions. The system comprises: a processing circuitry; and a memory, the memory containing instructions that, when executed by the processing circuitry, configure the system to: generate a preauthorized database transaction based on a received parameter and a parameter value; store the generated preauthorized database transaction in a temporary storage; access a reference database to determine a current value of the received parameter; determine that a current value of the received parameter matches the received parameter value; and commit the preauthorized database transaction to a database.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for preauthorizing database transactions to be committed at a later time to a database, based on a condition. A database transaction is received, which includes a parameter and a parameter value, based on which a condition for committing a preauthorized transaction is generated. The preauthorized transaction is generated based on the parameter and the parameter value. The system checks, for example periodically, to determine if the condition is satisfied. Once the condition is satisfied the system commits the preauthorized transaction to a database.

Preauthorizing database transactions is advantageous for example when the database transaction pertains to a purchase order. In a purchase order payment card industry (PCI) information of a user is exposed to a vendor's system (e.g., a vendor database). By preauthorizing the database transaction, the PCI information may be replaced with other PCI, for example of another party, the another party having a second transaction database. A second preauthorized transaction is generated, so that a first purchase order (i.e., preauthorized database transaction) is generated with the user PCI and committed to the second transaction database, and a second purchase order (i.e., the first preauthorized database transaction) with the PCI of the another party is committed to the first transaction database (i.e., the vendor database). Thus, the user PCI is always used only with a single transaction database, and the another PCI is used to replace the user PCI with all other vendor database transactions.

Furthermore, by storing preauthorized database transactions in a temporary transaction database, preauthorized database transactions may be committed to a transaction database at a time which is more convenient (i.e., when a network is less congested) in order to smooth out network traffic.

Additionally, preauthorizing a database transaction based on triggering a condition reduces network traffic. As a first example, network traffic is reduced since users are not constantly refreshing a query and requesting information from a database to check if the condition is satisfied. Rather than have multiple users query a database, each user having the same, or substantially same, query, a transaction server is configured to perform a single query. As a second example, when a user requests information, such a request often includes additional information. For example, a user checking to see if a price changed on an e-commerce website requests a resource from a URL, which may include, for example, an HTML page, various images, videos, advertisements, and the like, all of which require bandwidth in order to be provided to the user. By generating a preauthorized database transaction including a condition, the system queries the database without requesting all the associated content, and thus requires less bandwidth each time a query is sent.

Figure 1:
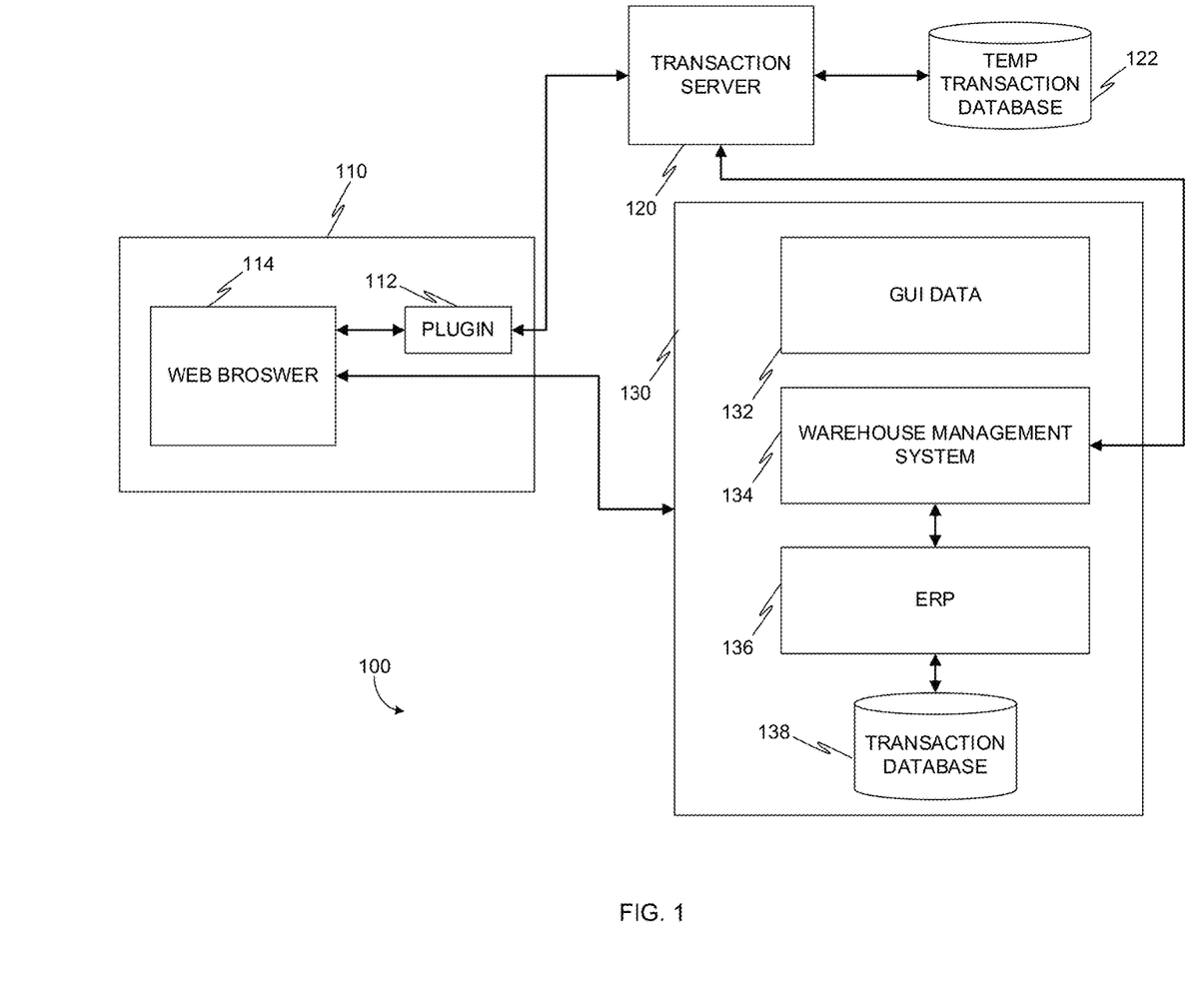
FIG. 1 is a diagram of a client device accessing a web server utilizing a transaction server, implemented in accordance with an embodiment.

FIG. 1 is an example diagram 100 of a client device 110 accessing a web server 130 utilizing a transaction server 120, implemented in accordance with an embodiment. A client device 110 is a personal computing device, and includes a display and an I/O interface. The client device may be, for example, a personal computer, a laptop, a tablet, a smartphone, or any other device capable of displaying a graphical user interface and receiving an input from a user. The client device 110 includes a web browser application 114. A web browser application 114 may be, for example, Microsoft® Edge, Mozilla® Firefox, Safari™, and the like. The web browser 114 is configured to render on the display of the client device 110 content which is received, for example from web servers accessed by the web browser 114. The web browser 114 may generate uniform resource locator (URL) requests over hypertext transfer protocol (HTTP). For example, the web browser 114 may generate a request to receive content from a URL which is directed to the server 130. In an embodiment the URL points to a hypertext markup language (HTML) content (i.e., page), which may further include multimedia content, graphical content (e.g., picture format file), text content, and the like.

The client device 110 further includes a web plugin 112 (also referred to as plugin 112). A web plugin is a software agent which runs concurrently with the web browser 114 and provides additional functionality which the web browser 114 does not support natively. In an embodiment the plugin 112 is implemented as a shared library, a directory including at least a script file, and the like. A script file may be, for example, a Python™ code. As used herein, the terms plugin, addon, or extension are interchangeable, and refer to a software component which provides the web browser 114 with additional predetermined functionality which the web browser 114 does not natively possess. In an embodiment the plugin 112 is configured to receive content requested by the web browser 114 from a web server, such as server 130, modify the content using another content, and provide the content to the web browser 114 for display on the client device 110. The plugin 112 may initiate communication with a transaction server 120. In an embodiment, the plugin 112 requests the another content from the transaction server 120.

The web server 130 (also referred to as server 130) includes graphical user interface (GUI) data 132, a warehouse management system (WMS) 134, an enterprise resource planning (ERP) application 136 (also referred to as ERP 136), and a transaction database 138 (also referred to as database 138). In an embodiment, GUI data 132 includes multimedia files, text files, video files, graphics files, folders, HTML files, and the like. GUI data 132 is data which is used by a web browser, such as web browser 114 to generate a GUI for displaying a display of a client device, such as client device 110. In an embodiment, GUI data 132 is referenced using a URL, so that when a client device requests the resource associated with the URL, the client device is provided with at least a portion of the GUI data 132. In an embodiment, GUI data 132 may include values which are retrieved from a database, such as the transaction database 138. The WMS 134 is a management system which communicates with the ERP application 136. In an embodiment, an ERP application 136 may provide a software infrastructure for a plurality of WMS applications. The ERP application 136 includes a database management system (DBMS) which is used to manage a database, such as database 138.

For example, the database 138 may store therein a table including data about an item. The data may include, for example, a number of stocked units, an identifier (such as a stock keeping unit—SKU), a name, a version number, an attribute, and the like. An attribute may be, for example, size, weight, color, and the like. The WMS 134 is configured to send and receive data based on the data stored in the database 138. For example, the WMS 134 may receive a request to read the number of stocked units, and if the number is or greater, fulfil an order to supply the item. In an embodiment the WMS 134 may further generate a shipping order based on the data, and based on user information (such as name, address, credit card information, and the like).

In an embodiment, the ERP application 136 manages a plurality of transactional databases. For example, a first database may store PCI information, a second database may store inventory data, a third database may store purchase order data, etc. In some embodiments, a database that is accessed by the transaction server to determine, for example, a value of a parameter, is referred to as a reference database.

The transaction server 120 is configured to manage a temporary transaction database 122. The temporary transaction database 122 is configured to receive database transaction requests which are authorized to commit to transaction database 138 when a predetermined condition is met. For example, the client device 110 generates a database transaction that is intended to be committed to the transaction database 138. The database transaction is received by the transaction server 120 which stores the database transaction in the temporary transaction database 122. In an embodiment, the transaction server 120 may store database transactions from a plurality of client devices, a plurality of database transactions from a single client device, or any combination thereof.

In certain embodiments, the transaction server 122 is configured to receive authorized transaction information, and further generate the database transaction. In some embodiments, the transaction server 122 is configured to modify the database transaction, for example, to obfuscate PII. As an example, the transaction server 122 may receive a database transaction, which when committed to the transaction database 138 may configure the server 130 to initiate a purchase order. The transaction server 122 may modify the database transaction, for example by replacing PCI data from the database transaction which identifies a user of the client device from which the database transaction was received. The PCI data may be replaced with secondary PCI data, for example of the transaction server 120. In this example, the client device 110 provides transaction server 120 with a purchase order, including a credit card number of a user. The transaction server 120 is then configured to modify the purchase order by removing the credit card number of the user and replacing it with a credit card number of the transaction server. The transaction server 120 then provides the modified purchase order to the server 130. Thus, the user data is obfuscated from the server 130.

This is advantageous for the user as their PCI data is limited only to the transaction server 120, while allowing the client device to make indirect purchase orders with a plurality of servers 130. Furthermore, by storing database transactions in the temporary transaction database 122, database transactions may be committed to the transaction database 138 at a time which is more convenient in order to smooth out network traffic.

Additionally, database transactions may be conditionally approved. For example, a database transaction may be approved to be committed to the transaction database 138 in response to a parameter stored therein having a predefined value. For example, a database transaction associated with a purchase order may be preapproved to be committed to the transaction database 138, in response to determining that a value of an item is at or below a predetermined threshold.

In certain embodiments utilizing a transaction server 120 to commit a preauthorized database transaction reduces network bandwidth, as it eliminates a user's need to periodically access the server 130 to determine a current value. For example, a user may periodically access the server 130, and request GUI data 132 as well as a value for an item parameter (e.g., 'price'), in an attempt to make a purchase when a price reduction occurs. However, these periodical requests, especially when multiplied by hundreds of thousands of users, require a large amount of dedicated processing and bandwidth. Furthermore, this typically occurs for popular items, such as consumer electronics, meaning that different users are requesting the same information.

By allowing a user to preauthorize a database transaction, which occurs when a purchase order for example is authorized, the periodical requests for GUI data 132 are eliminated, as the transaction server 120 does not require GUI data 132. When multiplied over a large number of user requests, the reduction in bandwidth is significant.

Furthermore, preauthorizing database transactions allows for committing the transaction immediately in response, for example, to an item being back in stock. This is especially advantageous as it again reduces bandwidth of users periodically checking if an item is back in stock. The transaction server 120 may periodically check to see if the condition of a preauthorized database transaction is met. A benefit of the transaction server 120 is realized both in aggregating multiple preauthorized database transactions having the same condition, and by the fact that the transaction server 120 eliminates the use of GUI data 132.

Figure 2:
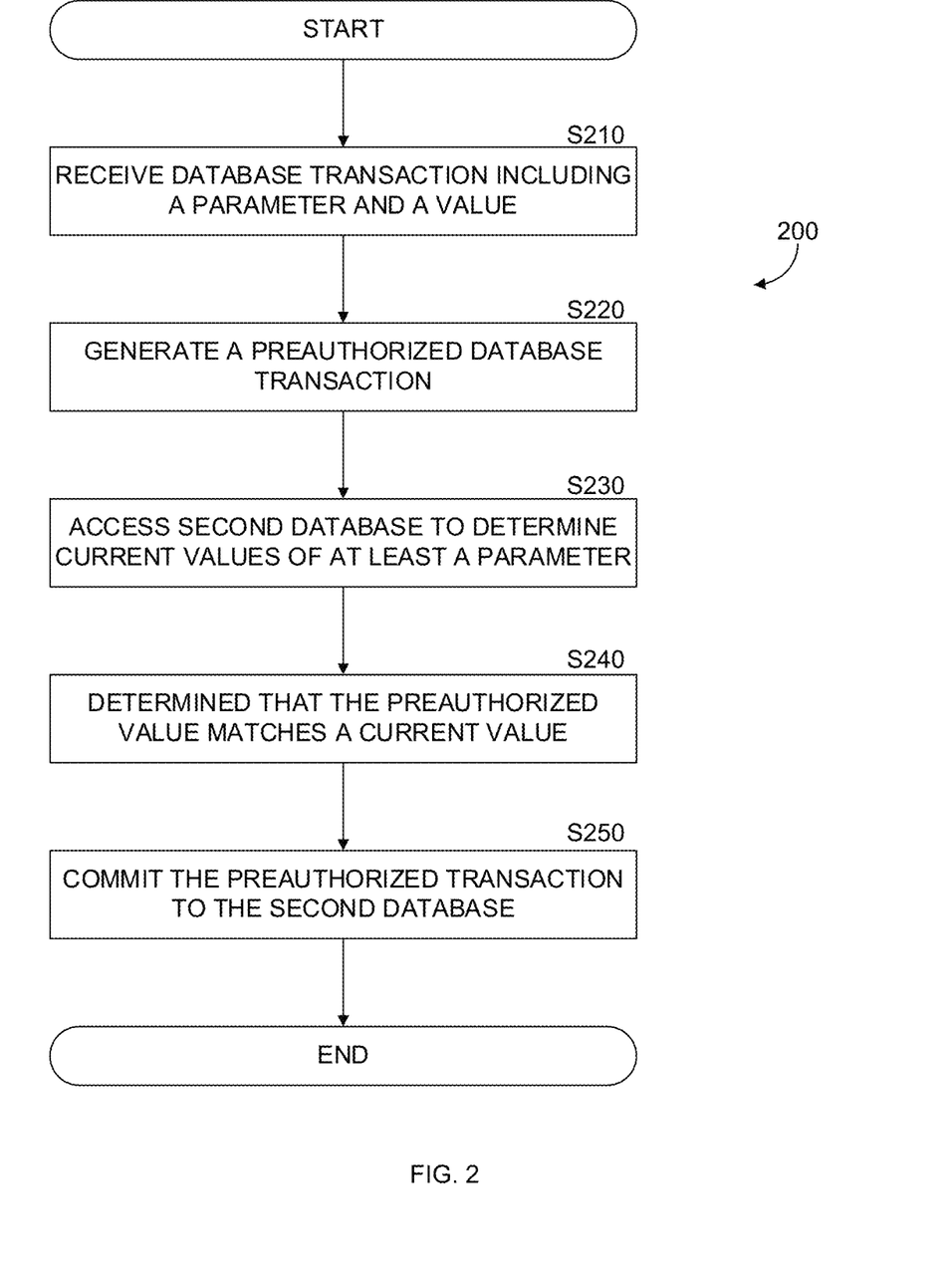
FIG. 2 is a flowchart of a method for committing preauthorizing database transactions, in accordance with an embodiment.

FIG. 2 is an example flowchart 200 of a method for committing preauthorizing database transactions, in accordance with an embodiment. A preauthorized database transaction is a database transaction, such as writing a value to a database, which a user has authorized to be committed to the database at some future time or based on a condition occurring.

At S210, a database transaction is received, including a parameter and value. In an embodiment, a parameter is: an item name, an item SKU, an attribute, a time, a percentage, PCI information, PII, and the like. In some embodiments, the value pertains to the parameter. For example, the parameter may be an item name and the value may be 'computer'. In certain embodiments, a plurality of parameters, and a plurality of values are received, each value pertaining to a parameter, wherein the number of values is equal to or smaller than the number of parameters. An example of a method for receiving a database transaction and facilitation of the same is discussed in more detail in FIG. 3 below. In some embodiments, the parameter and value are received, and a database transaction is generated based on the received parameter and value.

At S220, a preauthorized database transaction is generated. In an embodiment, the preauthorized database transaction is generated based on the received parameter and value. The preauthorized database transaction is a database transaction which is authorized, for example, by a user, to be committed to a transaction database. In certain embodiments, a value of a received parameter may be modified to another value, for example in order to secure PII, PCI information, and the like. For example, a database transaction may be a purchase order which is recorded in a transaction database. The purchase order may include PCI of a user, such as a credit card number. The PCI of the user may be replaced with another PCI, such as a credit card number associated with an organization.

In some embodiments, a second database transaction may be generated. In the example of the purchase order, a database transaction representing the purchase order is generated, with the user PCI replaced with another PCI. The database transaction with the another PCI is a transaction which is preauthorized to be committed to the transaction database, i.e., a third party transaction database, such as the transaction database 138 of FIG. 1 above. The second database transaction is a database transaction with the user PCI, and it is preauthorized to be committed to a second transaction database, such as the temporary transaction database 122 of FIG. 1 above. This is advantageous, as it allows sensitive data, such as PCI of a user to be utilized on a single database (e.g., the transaction database 122) for a plurality of purchase orders, where the purchase orders may be directed to different transaction databases. Rather than store sensitive data on each of those databases, the sensitive data is stored on a single database, thus reducing the risk of a data breach by reducing the amount the sensitive data is externally exposed.

In certain embodiments, the preauthorized database transaction may be stored in a temporary transaction database, until a time when a determination is made that the database transaction should be committed to the transaction database. The another PCI allows a user to obfuscate their personal (i.e., sensitive) data.

At S230, a second database is accessed to determine a current value of the received parameter. In an embodiment, the second database is the transaction database. In the example above of the purchase order, a parameter may be price. The database transaction may be conditionally preauthorized to be committed when the parameter value of price is at or below a predetermined value. In certain embodiments, the second database may be accessed periodically to determine the current value.

At S240, the current value is determined to match the value of the preauthorized database transaction. In some embodiments, matching which is performed between numerical values includes matching within a predetermined range. For example, a numerical match may be made between two values, within 5% of each other. In certain embodiments, matching which is performed between string values may include performing a natural language processing (NLP) scoring between the string values. For example, Word2vec may be used to determine if a first string matches a second string within a predefined threshold. For example, the NLP scoring may be utilized to determine that 'black' and 'noir' product attributes are a match.

At S250, the preauthorized database transaction is committed. In an embodiment, where a second database transaction is generated, the second database transaction may be committed in response to determining that the preauthorized database transaction was successfully committed, for example to the transaction database. In some embodiments, the transaction database may send a response indicating that the preauthorized database transaction failed to commit. Multiple attempts may be performed to commit the preauthorized database transaction. Where the preauthorized database transaction failed to commit, but the second database transaction was successfully committed, an instruction may be generated to undo (e.g., erase) the second database transaction.

In some embodiments, a batch of preauthorized database transactions may be generated. A batch of transactions may be, for example, related to a single item, combining transactions from a plurality of client devices (or user accounts). For example, a plurality of preauthorized database transactions, each directed to a purchase order for the same model of laptop shipped to a different address, may be used to generate a batch instruction. The batch instruction in this example is a single purchase order for the plurality of items (i.e., laptop model), each shipped to a different address.

Figure 3:
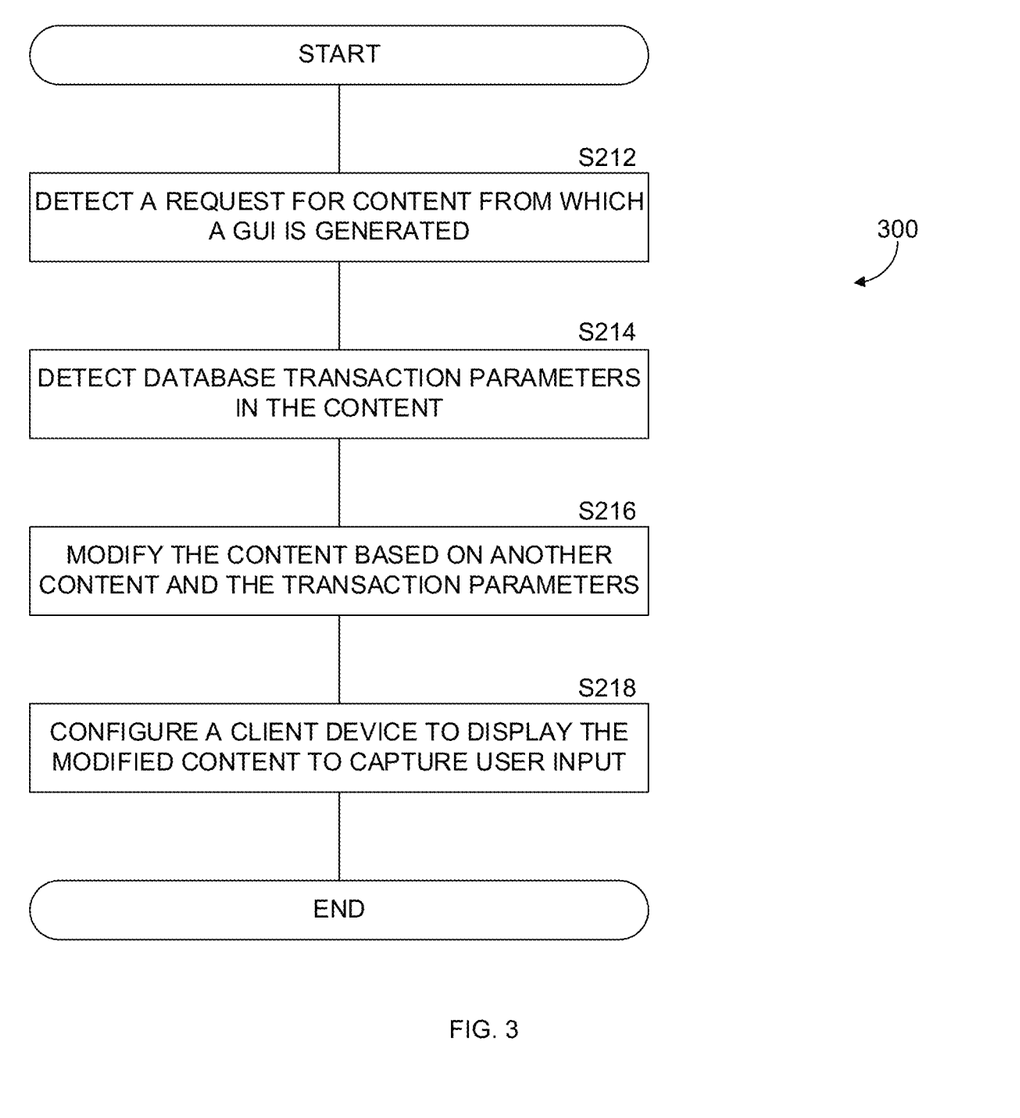
FIG. 3 is a flowchart of a method for receiving a database transaction, implemented in accordance with an embodiment.

FIG. 3 is an example flowchart 300 of a method for receiving a database transaction, implemented in accordance with an embodiment. Receiving a database transaction may be performed in response to a modification of content requested by the user device. Receiving a database transaction may be utilized, for example, in a method for committing preauthorizing database transactions.

At S212, a request for content is detected. In an embodiment, the request for content includes a request for a resource associated with a URL. A resource may be, for example, an HTML page, a text, a multimedia content, a combination thereof, and the like. In an embodiment the request is generated using HTTP. The request may be generated by a web browser of a client device. The web browser may be configured to render a graphical user interface (GUI) based on the content. In some embodiments, the content may include code, such as HTML, XML, JavaScript®, and the like.

At S214, a database transaction parameter is detected in the content. In an embodiment, a plurality of database transaction parameters are detected. In some embodiments a database transaction parameter is a data field having a value which is intended to be written to a database. In the example of the purchase order, a database transaction parameter may be, for example, an item name, a SKU, an attribute, a description, a price, and the like. An attribute may be, for example, a color of the item, a size of item, a weight of the item, and the like.

In certain embodiments detecting database transactions includes searching the content for predefined indicators. For example, a text or HTML file may be searched for a word, or words, which indicate certain parameters. In some embodiments, the content may be further searched to detect values of at least a portion of the parameters. For example, an item size may be a parameter, having values of 'small', 'medium', or 'large'.

At S216, the content is modified based on another content and the detected database transaction parameter. In an embodiment, code included in the content is modified to generate a new code. Modifying code may include adding code, removing code, and a combination thereof. In some embodiments the modified content includes a data field to receive input from a user, such as a user of client device 110 of FIG. 1 above. In certain embodiments the another content, or a portion thereof, may be received from a transaction server, such as transaction server 120 of FIG. 1 above.

For example, the content may be a markup language file, such as HTML. A second HTML portion may be inserted into the content (i.e., the HTML file), the second HTML portion, when executed by a web browser application configures a user device running the web browser application to generate a second content as an overlay over the content generated by the original HTML file. Such an example is discussed in more detail in FIG. 4C below.

At S218, the modified content is displayed. In some embodiments, a client device running a web browser may be configured to display the modified content. In certain embodiments the modified content may be generated as an overlay which is displayed over the original content (i.e., the unmodified content). Content and modified content examples are discussed in more detail with respect to FIGS. 4A through 4C.

Figure 4A:
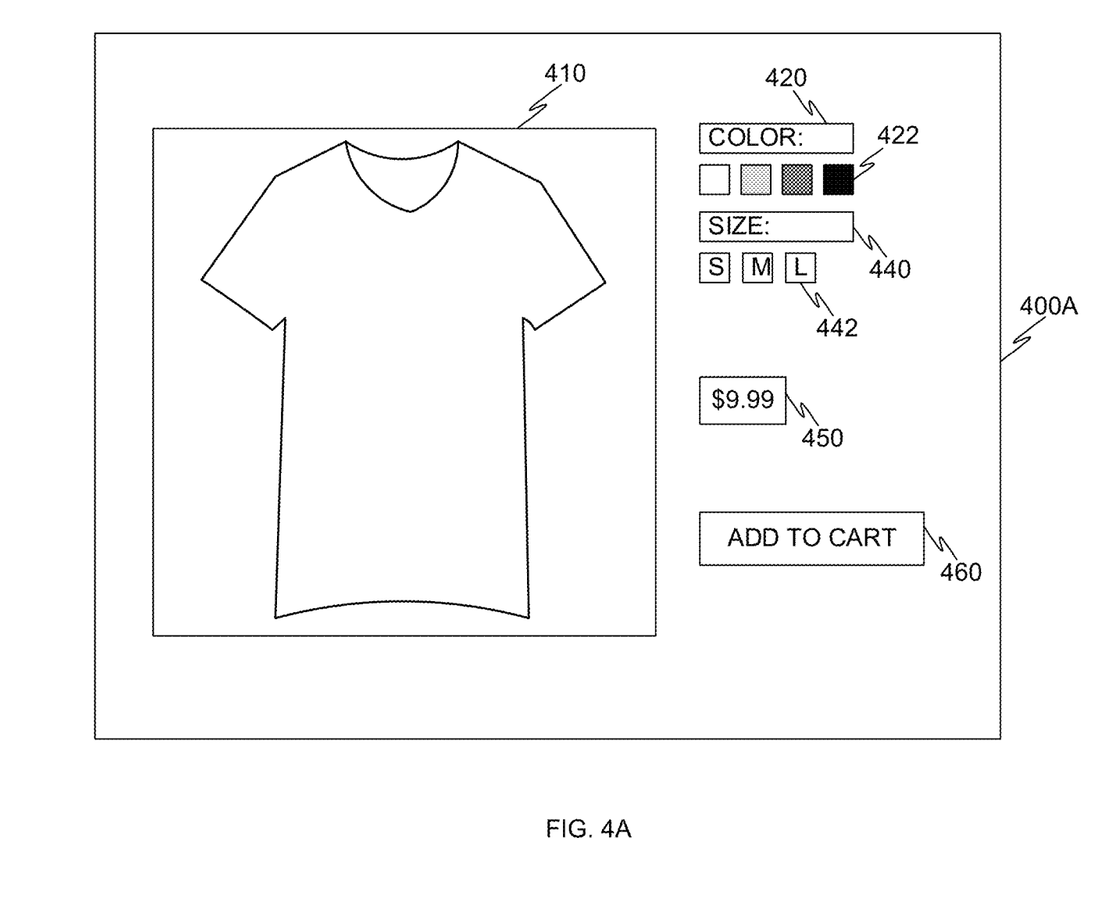
FIG. 4A is a diagram of a web browser application displaying content, utilized to describe an embodiment.

FIG. 4A is an example diagram of a web browser application 400A displaying content, utilized to describe an embodiment. The web browser application 400A (also referred to as browser 400A) is a software application executed on a client device which provides the client device with connectivity to the Internet, and displays content, such as content which is identifiable by using a uniform resource locator (URL). The browser 400A displays content elements, such as an item depiction 410, a first item attribute 420 and a first attribute value 422, a second item attribute 440 and a second attribute value 422, a price indicator 450, and an interactive element 460 which receives a user input.

For example, an action may be performed in response to detecting that a user interacted with the interactive element 460, for example by clicking on the interactive element 460. In this example the interactive element 460, when clicked (or otherwise engaged with), generates a request to generate a conditional purchase order. A conditional purchase order includes a database transaction which identifies an item for purchase. The database transaction is not committed until a user provides input, for example through the browser, that the purchase order is approved, and in response to the approval the database transaction is executed. For example, an 'add to cart' button on a GUI adds the viewed item, having the selected attributes, to a cart, which is a data structure containing therein data on at least the item. A purchase order may be generated from the data structure, for example in response to a user input.

Figure 4B:
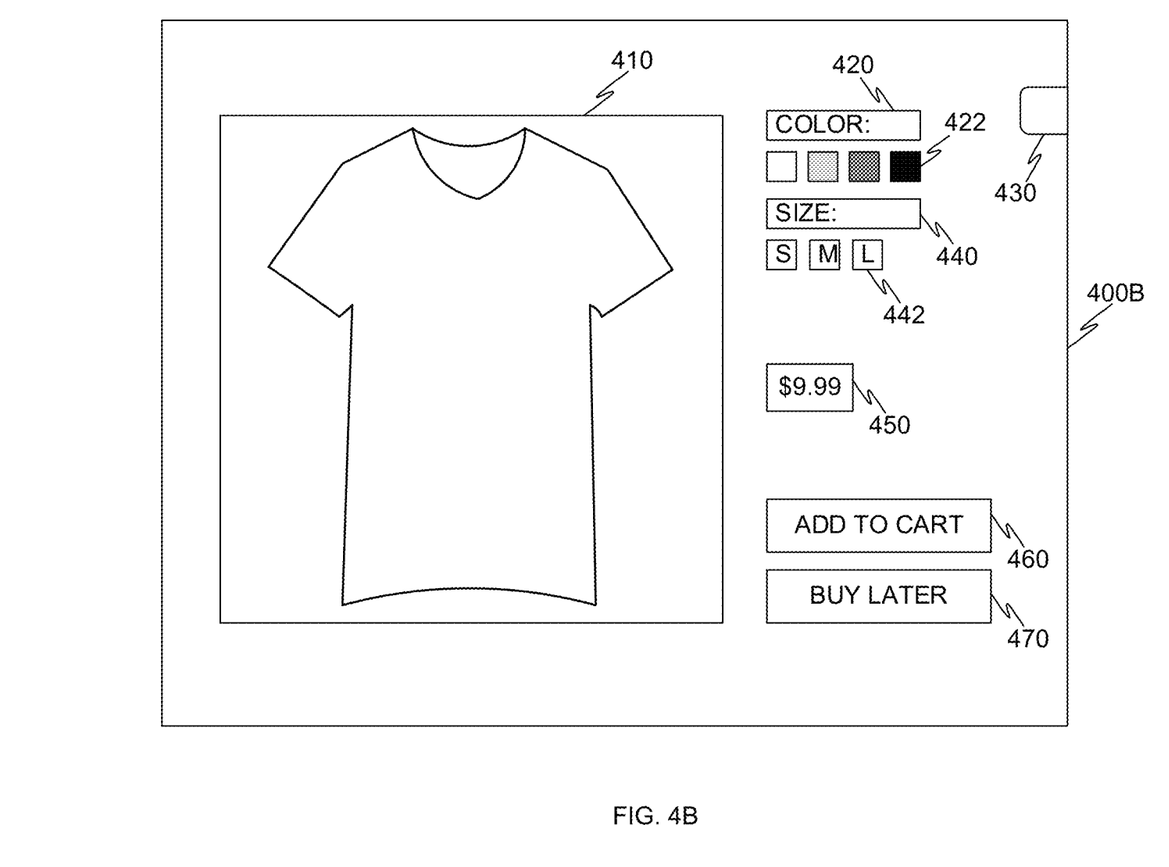
FIG. 4B is a diagram of a web browser application displaying modified content, utilized to describe an embodiment.

FIG. 4B is an example diagram of a web browser application 400B displaying modified content, utilized to describe an embodiment. The modified content includes a tab 430, and a second interactive element 470. The tab 430, when engaged, configures the browser 400B to further display another content, shown in more detail in FIG. 4C below. The second interactive element 470 provides the web browser application 400B with an action not previously available from the original content (i.e., the action provided by interactive element 460).

In this example, the second interactive element 470, when engaged, generates a conditional purchase order, using an input received from a user to generate such a condition. In some embodiments, a plurality of conditions are provided, for example by displaying in the browser 400B, and a user selection is received for at least one of the plurality of conditions. In some embodiments, the tab 430 may be displayed as an overlay over the web page generated from the content. This allows a user to scroll through a web page while the overlay remains in the same place on the display, which allows quick access to the functionality of the tab 430.

Figure 4C:
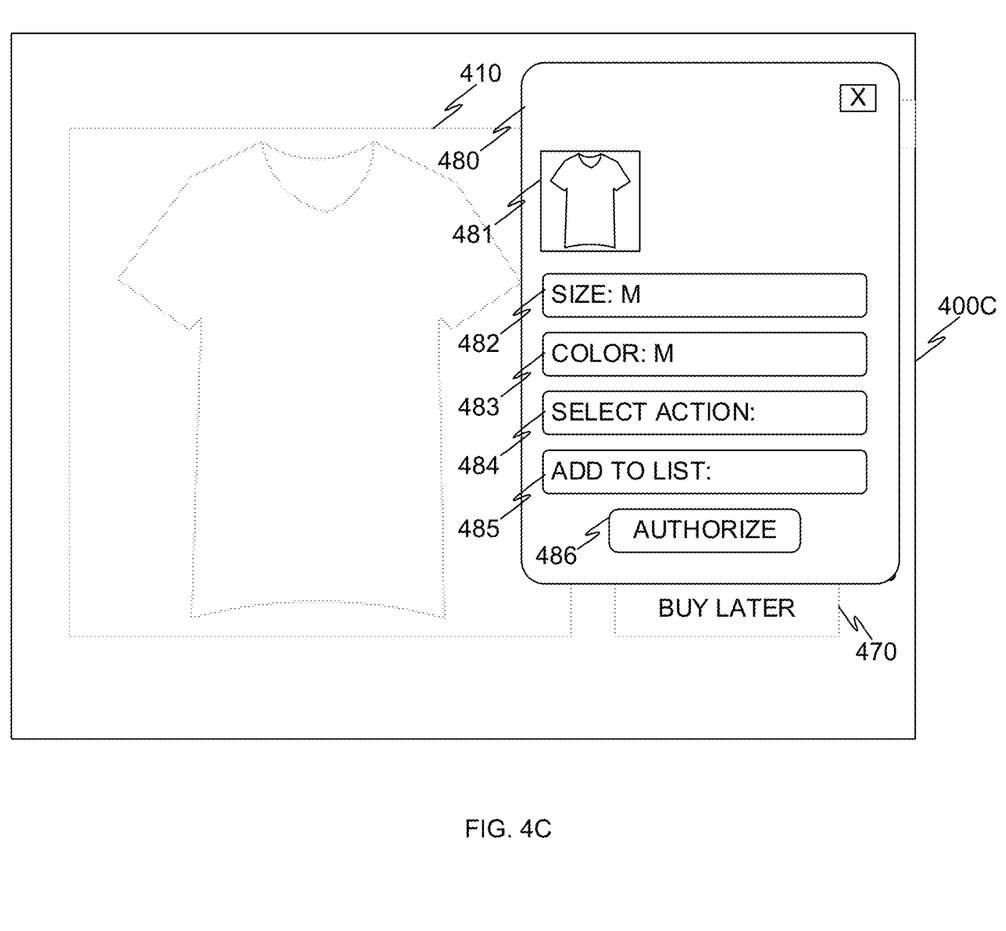
FIG. 4C is a diagram of a web browser application displaying modified content with a second content, utilized to describe an embodiment.

FIG. 4C is an example diagram of a web browser application 400C displaying modified content with a second content 480, utilized to describe an embodiment. In certain embodiments, an opaque overlay may be generated over the web page of the browser application 400C. This is advantageous as a visual aid to indicate to a user that their attention should be focused on another content, such as the second content 480. In an embodiment, the second content 480 is generated based on a detected transaction parameter, and content received from a transaction server. For example, the transaction server may send code, such as HTML code, which when executed by the browser application 400C configures the browser application 400C to display the second content 480.

The second content 480 includes an icon 481, which represents the item depiction 410. In an embodiment, the icon 481 serves as a visual indicator connecting the second content 480 to the content originally displayed, for example by the web browser application 400B of FIG. 4B above. The second content 480 further includes a first selection 482, which represents the first item attribute 420 having the first attribute value 422, and a second selection 483, which represents the second item attribute 440 having the second attribute value 422. In certain embodiments a plurality of selections may be displayed, based for example, on a number of attributes, parameters, and the like, detected in the content.

The second content 480 further includes an action selection 484, an optional list selection 485, and an interactive element 486. The interactive element 486, when engaged, configures the web browser application 400C to generate a preauthorized purchase order, including a preauthorized database transaction. In an embodiment the action selection 484 receives a user input to determine a condition in response to which the preauthorized database transaction may be committed. For example, a condition may be when an item price is at or below a predefined value, when an item price has been reduced by a predefined percentage, when an item is back in stock, and the like.

In some embodiments, an optional list selection 485 is modified upon receiving a feedback from the user input from which a tag is generated and associated with the preauthorized database transaction. The tag may be further based on a specific user account. In such embodiments, a transaction server can execute all preauthorized database transactions having a certain tag value. This allows a user to make related purchase orders from various different servers which may not communicate with each other, and then execute the purchase as a single purchase from one location, which is the transaction server. This is advantageous as it allows a user to reduce exposure sensitive data, such as PCI information, which is only shared with the transaction server, and not each of a plurality of purchase order servers.

In certain embodiments, engaging with an interactive element may include, for example, providing an input from a mouse (i.e., clicking), providing an input from a touch device, and the like.

Figure 5:
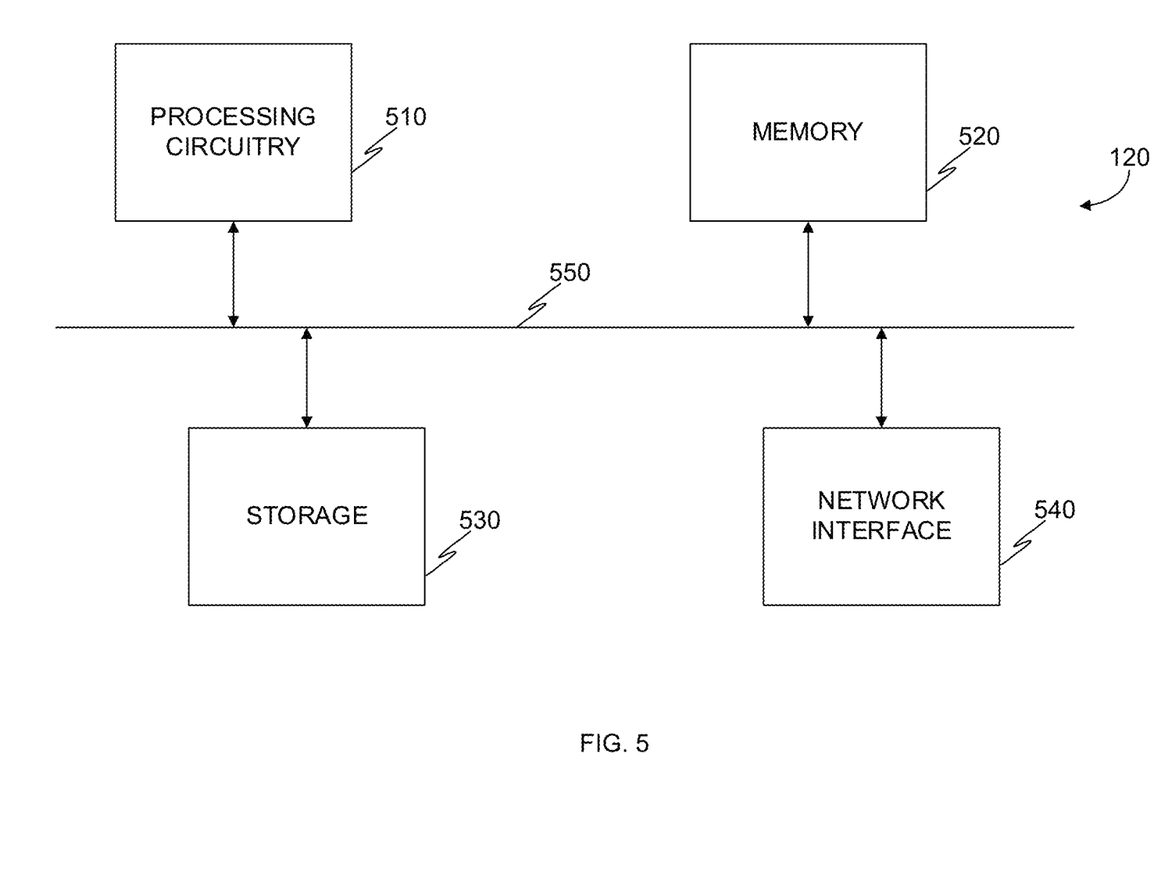
FIG. 5 is a schematic diagram of the transaction server according to an embodiment.

FIG. 5 is an example schematic diagram of the transaction server 120 according to an embodiment. The transaction server 120 includes a processing circuitry 510 coupled to a memory 520, a storage 530, and a network interface 540. In an embodiment, the components of the transaction server 120 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, or any other medium which can be used to store the desired information. In an embodiment the storage 530 may be used to store a database, such as temporary transaction database 122, used to store therein preauthorized database transactions.

The network interface 540 allows the transaction server 120 to communicate with, for example, the plugin 112, server 130, and the like.

It should be understood that the embodiments described herein are not limited to the specific architecture illustrated in FIG. 5, and other architectures may be equally used without departing from the scope of the disclosed embodiments. Further, the transaction server may be implemented in a cloud computing platform and served as an element of an e-commerce system.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for committing preauthorized database transactions, comprising:
generating a preauthorized database transaction based on a received parameter and a parameter value;
storing the generated preauthorized database transaction in a temporary storage;
accessing a reference database to determine a current value of the received parameter;
determining that a current value of the received parameter matches the received parameter value;
committing the preauthorized database transaction to a database;
detecting a request for a web based content;
detecting the received parameter in the web based content; and
generating a modified web based content based on the detected parameter, the modified web content including a data field to receive a user input based on the received parameter, wherein the modified web based content is an overlay rendered for display on top of the web based content.

2. The method of claim 1, further comprising:
generating another preauthorized database transaction based on the received parameter and a modified parameter value; and
committing the another preauthorized database transaction to a different database, in response to committing the preauthorized database transaction to the database.

3. The method of claim 2, wherein the parameter value is a sensitive data, and the modified parameter value is an obfuscated data.

4. The method of claim 2, further comprising:
erasing the another preauthorized database transaction from the different database, in response to determining that the preauthorized database transaction was not successfully committed to the database.

5. The method of claim 1, further comprising:
matching the current value of the parameter to the parameter value by generating a numerical value difference; and
determining that the current value of the parameter matches the parameter value when the numerical value difference is equal to, or less than, a predetermined threshold.

6. The method of claim 1, further comprising:
generating a batch of preauthorized transactions, each preauthorized transaction having a common parameter and a common value.

7. The method of claim 1, further comprising:
causing a client device to install a plugin for a web browser, the web browser generating the request for the web content.

8. The method of claim 1, wherein the preauthorized database transaction is a purchase order.

9. The method of claim 8, wherein the received parameter is any one of: an item name, an item SKU, an attribute, a time, a percentage, payment card industry (PCI) information, and personal identifiable information (PII).

10. A non-transitory computer readable medium having stored thereon instructions for causing a processing circuitry to execute a process, the process comprising:
generating a preauthorized database transaction based on a received parameter and a parameter value;
storing the generated preauthorized database transaction in a temporary storage;
accessing a reference database to determine a current value of the received parameter;
determining that a current value of the received parameter matches the received parameter value;
committing the preauthorized database transaction to a database;
detecting a request for a web based content;
detecting the received parameter in the web based content; and
generating a modified web based content based on the detected parameter, the modified web content including a data field to receive a user input based on the received parameter, wherein the modified web based content is an overlay rendered for display on top of the web based content.

11. A system for committing preauthorized database transactions, comprising:
a processing circuitry; and
a memory, the memory containing instructions that, when executed by the processing circuitry, configure the system to:
generate a preauthorized database transaction based on a received parameter and a parameter value;
store the generated preauthorized database transaction in a temporary storage;
access a reference database to determine a current value of the received parameter;
determine that a current value of the received parameter matches the received parameter value;
commit the preauthorized database transaction to a database;
detect a request for a web based content;
detect the received parameter in the web based content; and
generate a modified web based content based on the detected parameter, the modified web content including a data field to receive a user input based on the received parameter, wherein the modified web based content is an overlay rendered for display on top of the web based content.

12. The system of claim 11, wherein the memory further contains instructions that, when executed by the processing circuitry, further configure the system to:
generate another preauthorized database transaction based on the received parameter and a modified parameter value; and
commit the another preauthorized database transaction to a different database, in response to committing the preauthorized database transaction to the database.

13. The system of claim 12, wherein the parameter value is a sensitive data, and the modified parameter value is an obfuscated data.

14. The system of claim 12, wherein the memory further contains instructions that, when executed by the processing circuitry, further configure the system to:
erase the another preauthorized database transaction from the different database, in response to determining that the preauthorized database transaction was not successfully committed to the database.

15. The system of claim 11, wherein the memory further contains instructions that, when executed by the processing circuitry, further configure the system to:
match the current value of the parameter to the parameter value by generating a numerical value difference; and
determine that the current value of the parameter matches the parameter value when the numerical value difference is equal to, or less than, a predetermined threshold.

16. The system of claim 11, wherein the memory further contains instructions that, when executed by the processing circuitry, further configure the system to:
generate a batch of preauthorized transactions, each preauthorized transaction having a common parameter and a common value.

17. The system of claim 11, wherein the memory further contains instructions that, when executed by the processing circuitry, further configure the system to:
cause a client device to install a plugin for a web browser, the web browser generating the request for the web content.

18. The system of claim 11, wherein the preauthorized database transaction is a purchase order.

19. The system of claim 18, wherein the received parameter is any one of: an item name, an item SKU, an attribute, a time, a percentage, payment card industry (PCI) information, and personal identifiable information (PII).

* * * * *